May 6, 1924.

J. BRODIE

MOTOR VEHICLE

Filed Aug. 24, 1923

Inventor
Joseph Brodie
By Milton Tibbetts
Attorney

Patented May 6, 1924.

1,493,319

UNITED STATES PATENT OFFICE.

JOSEPH BRODIE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed August 24, 1923. Serial No. 659,071.

*To all whom it may concern:*

Be it known that I, JOSEPH BRODIE, a citizen of the United States, and resident of Detroit, Wayne County, State of Michigan, have invented certain new and useful Improvements in Motor Vehicles, of which the following is a specification.

This invention relates to motor vehicles, more particularly to the clutch and the transmission gear bearings thereof, and it has for an object to provide improved lubrication for such bearings which shall be positive and efficient, and in which the leakage of lubricant to the clutch elements and to the ground shall be prevented.

Other objects of the invention will appear from the following description taken in connection with the drawing, which forms a part of this specification, and in which:

Fig. 1 is a view, partially in elevation and partially in vertical longitudinal section through a motor vehicle transmission gearing and clutch actuating mechanism, embodying this invention;

Fig. 2 is a transverse section, substantially on the line 2—2 of Fig. 1, and

Fig. 3 is a detailed section substantially on the line 3—3 of Fig. 2.

Referring to the drawing, at 10 is illustrated the transmission gear set of a motor vehicle, by means of which torque and speed changes between the prime mover and the driving axle of the vehicle, are effected. The gearing 10 is enclosed by a suitable housing 11 consisting of a front wall 12, a rear wall 13, suitable side walls (not shown) and a bottom, and is adapted to contain suitable lubricant, preferably heavy oil. The housing 11 is also provided with a suitable cover plate 14.

The gear set 10 comprises the usual main transmission shaft 15, provided with longitudinal splines 16, and a counter shaft 17, suitably mounted in the housing 11. Projecting through the front wall 12 of the housing 11 is a driving shaft 18, connected at its forward end to the vehicle clutch and mounted in alinement with the transmission shaft 15, the forward end of which may have the ordinary spigot mounting (not shown) in the enlarged end of the shaft 18. Rigidly secured to the enlarged end of the shaft 18, within the housing 11 and adjacent the front wall 12 thereof is a gear 19. Slidably mounted in coaction with the splines 16 of the shaft 15 are suitable gears 21 and 22, respectively provided with grooved collars 23 adapted to cooperate with suitable shifter forks 24. The forks 24 are mounted on slidable shifter rods 26, adapted for actuation by a shift lever 27 in a manner well understood in the art to which this invention relates. The counter shaft 17 comprises a rotatable sleeve, to which is rigidly secured a gear 28 which is adapted for constant mesh with the gear 19 on the shaft 15, and with suitable reduction gears 29. The gears 21 and 22 on the shaft 15 are slidable to engage with the gears 29 to effect the various reduction ratios as is well understood, the gear 21 having internal teeth (not shown) adapted to engage the gear 19 to provide a direct drive. The counter shaft 17 is suitably journaled on an arbor 33 mounted in the front and rear walls 12 and 13 of the gear housing 11, and the transmission shaft 15 is journaled in appropriate bearings 31 and 32, also mounted in the front and rear walls 12 and 13 of the housing 11, respectively. The transmission shaft 15 is connected at its rear end to a suitable propeller shaft (not shown) through which the rear axle of the vehicle is driven from the gear set 10.

The gear set 10 is adapted for connection to the prime mover of the motor vehicle through a suitable clutch 37, which comprises a driving element (not shown) rigidly connected to the vehicle motor, and a driven element 38, adapted for keyed connection to the shaft 18. Between the driving and driven elements of the clutch are arranged suitable friction discs 39, urged into contact by springs 41 to effect connection of the parts, in the usual manner. The clutch elements are separated by means of a sleeve 42, connected to the driven member, and mounted on a clutch throwout bearing 43 as clearly shown in Fig. 1. The throw-out bearing 43 is connected to a suitable clutch lever 44, manually operated to retract the bearing 43 and its associated sleeve 42, compress the springs 41, and thus disengage the clutch discs 39. The clutch throw-out bearing 43 comprises an inner race ring 46 and an outer race ring 47, mounted in a suitable hub 48, which hub is a sliding fit in an extension 49 of the front gear housing wall 12.

In practice, the clutch throw-out bearing 43 is subjected to severe loads, particularly when the vehicle is moving with the gears in mesh and the clutch disengaged, and requires thorough and copious lubrication to prevent its rapid wear. Lubricant for this purpose is supplied from the gear housing 11. Rotatably mounted on the bearing 31, adjacent the inner surface of the front wall 12 is a plate or washer 51, provided with suitable metering holes 52 located substantially along the periphery of the gear 18. In the operation of the gearing, the gear 28, the lower portion of which is submerged in lubricant in the housing 11, carries this lubricant with it to the point at which it meshes with the gear 18. At this point the pressure of the teeth on the respective gears forces the lubricant out axially through the metering holes 52 into the interior of the bearing elements 31. The lubricant is carried around by the bearing 31 and flows outwardly along the shaft 18 into contact with a felt washer 53 mounted between this shaft and the sleeve 42, by which it is prevented from travel into contact with the clutch plates 39. Lubricant in contact with the felt washer 53 is fed through suitable ducts 54, formed in the sleeve 42, to the wearing surfaces of the bearing 43.

The return of lubricant from the bearing 43 is effected through a passage 56 which is downwardly inclined from a point below the bearing 31 in the front wall extension 49, through the front wall 12 into the housing 11. The wall 12 is provided on its interior face with a suitable boss 57, so that the passage 56 enters the housing 11 through a surface at right angles to its axis.

It will be noted that the point of entry of the passage 56 is abreast the gear 28, the lower portion of which is submerged in the lubricant in the housing 11. This lubricant is being constantly carried over by the motion of the gear 28, and is thrown off adjacent the front wall 12 near the point of entry of the passage 56 therein. Under certain conditions, particularly when cold and stiff, the lubricant does not flow away from the end of the passage 56 with sufficient rapidity to prevent it from piling up in this passage, thus effectually preventing a free return of lubricant from the bearing 43. A regurgitation of the lubricant through the passage 56 then occurs, and the resulting excess lubricant in the sleeve 42 is forced past the felt washer 53 into the clutch housing, to the detriment of the clutch discs 39. This lubricant eventually leaks from the clutch housing to the ground and is wasted. To remedy this condition a pocket 58 is provided in the front wall 12 of the housing 11. The pocket 58 is preferably of a trough shape, vertically disposed, and is formed by casting the wall of the housing 11 with a suitably curved portion. This pocket 58 is located in the front wall 12 so as to be substantially under the exit of the passage 56, and is accordingly abreast the point of discharge of excess lubricant carried over by the gear 28. In this manner sufficient room is provided for the free discharge of this lubricant, which is thereby prevented from piling up at the end of the passage 56.

It will be evident that this invention insures a positive and continuous supply of lubricant to the clutch bearings of the vehicle and at the same time prevents the piling up of excess lubricant in the return passage therefrom.

It will be understood that various forms of the invention other than those described above may be used without departing from the spirit or scope of the invention.

What is claimed is:

1. The combination with a motor vehicle of a transmission gear case adapted to contain lubricant and having a front wall, a housing secured to the gear case adjacent said wall, a bearing in the housing adapted to receive lubricant from the gear casing and means including a passage through the wall and a pocket formed in the wall and opening into the gear case for returning lubricant from the bearing to said case.

2. The combination with a motor vehicle of a transmission gear case adapted to contain lubricant and having a front wall, means including a passage through said wall to conduct lubricant therethrough, and means in said wall including a pocket opening into the gear case and communicating at its upper end with the passage to expedite the return of lubricant into the gear case.

3. The combination with a motor vehicle of gearing, a housing therefor having a front wall and adapted to contain lubricant, a bearing mounted on the outer face of said front wall, means to supply the bearing with lubricant from the housing and means including a pocket in the inner side of the front wall to expedite the return of lubricant to the housing.

4. The combination with a motor vehicle of gearing, a housing therefor having a front wall and adapted to contain lubricant, a bearing mounted on the outer face of said front wall, means to supply the bearing with lubricant from the housing, and means including a pocket in the front wall and an inclined passage through the wall into said pocket to return lubricant to the housing.

5. A housing for the transmission gear of motor vehicles having a pocket in the front wall thereof for the purpose described.

6. In a transmission gearing, a housing having a wall, a gear mounted to revolve in the housing in proximity to the wall, and lubricant conveying means comprising an inclined passage through the wall and a pocket in the wall adjacent the periphery of said gearing.

7. In a motor vehicle, a gear housing adapted to contain lubricant, a thrust bearing mounted exteriorly of the housing, means to supply the thrust bearing with lubricant from the housing and means including an inclined passage and a pocket in the housing to return oil from the bearing to the housing.

8. In a motor vehicle, a housing having a wall and adapted to contain lubricant, cooperating gears within the housing adjacent the wall, a bearing exteriorly of the wall, means operable by a gear to supply lubricant to the bearing, a return passage for the lubricant through the wall, and means associated with the wall to prevent the piling up of lubricant between the gears and the wall.

9. In a motor vehicle, a housing having a wall and adapted to contain lubricant, cooperating gears within the housing adjacent the wall, a bearing exteriorly of the wall adapted for lubrication from the housing, and return means for the lubricant including a pocket in the wall adjacent the gears.

10. In a motor vehicle transmission gearing, a housing therefor adapted to contain lubricant, a bearing, means for feeding lubricant to the bearing from the housing, and return means for the lubricant including an inclined passage into the housing and a pocket in the housing connected to said passage.

In testimony whereof I affix my signature.

JOSEPH BRODIE.